(12) United States Patent
Bhide et al.

(10) Patent No.: US 9,873,802 B2
(45) Date of Patent: Jan. 23, 2018

(54) LOW VOC ISOXAZOLIDINE AS OPEN TIME EXTENDERS IN WATER BORNE PAINTS

(71) Applicant: ANGUS Chemical Company, Buffalo Grove, IL (US)

(72) Inventors: Shreyas Bhide, Mumbai (IN); Asghar Peera, Cary, IL (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 0 days.

(21) Appl. No.: 15/039,537

(22) PCT Filed: Dec. 9, 2014

(86) PCT No.: PCT/US2014/069345
§ 371 (c)(1),
(2) Date: May 26, 2016

(87) PCT Pub. No.: WO2015/089072
PCT Pub. Date: Jun. 18, 2015

(65) Prior Publication Data
US 2017/0158885 A1 Jun. 8, 2017

(30) Foreign Application Priority Data
Dec. 9, 2013 (IN) .......................... 5675/CHE/2013

(51) Int. Cl.
*C09D 7/12* (2006.01)
*C08K 5/353* (2006.01)

(52) U.S. Cl.
CPC ............ *C09D 7/1233* (2013.01); *C08K 5/353* (2013.01)

(58) Field of Classification Search
CPC ..... C08K 5/353; C07D 273/01; C07D 261/02
See application file for complete search history.

(56) References Cited

U.S. PATENT DOCUMENTS

| 4,256,620 A * | 3/1981 | Aigner ................. C08G 63/914 524/95 |
| 5,037,867 A | 8/1991 | Ravichandran et al. |
| 5,561,178 A | 10/1996 | Prabhu |
| 6,001,927 A * | 12/1999 | Billmers ................... C08F 2/24 524/732 |
| 8,080,609 B2 | 12/2011 | Schmatloch |
| 8,097,306 B2 | 1/2012 | Yamaguchi et al. |
| 2010/0286096 A1 | 11/2010 | Yin et al. |

FOREIGN PATENT DOCUMENTS

WO   WO-2014/099070   6/2014

OTHER PUBLICATIONS

Notice of Reasons for Rejection issued on Japanese Application 2016-536936, dated Nov. 14, 2016.
International Preliminary Report on Patentability issued on PCT/US2014/069345, dated Jun. 23, 2016.
Ali et al., "The isoxazolidines: the effects of steric factor and hydrophobic chain length on the corrosion inhibition of mile steel in acidic medium," Corrosion Science 47 (2005), pp. 2569-2678.
International Search Report and Written Opinion on PCT/US2014/069345, dated Mar. 9, 2015.

* cited by examiner

*Primary Examiner* — Brieann R Johnston
(74) *Attorney, Agent, or Firm* — Foley & Lardner LLP

(57) ABSTRACT

The disclosure provides paint compositions that comprise isoxazolidine derivatives that are low in volatile organic compounds (VOCs). These compositions have extended open time, and are suitable for both water-based and organic solvent-based formulations.

20 Claims, No Drawings

LOW VOC ISOXAZOLIDINE AS OPEN TIME EXTENDERS IN WATER BORNE PAINTS

CROSS-REFERENCE TO RELATED PATENT APPLICATIONS

This application is a U.S. national stage application of International Application No. PCT/US2014/069345, filed on Dec. 9, 2014, which in turn claims the benefit of Indian Patent Application 5675/CHE/2013, filed on Dec. 9, 2013, the contents of both of which are incorporated by reference in their entirety for any and all purposes.

BACKGROUND OF THE INVENTION

Field of the Invention

The disclosure provides paint compositions that comprise isoxazolidine derivatives that are low in volatile organic compounds (VOCs). These compositions have extended open time, and are suitable for both water-based and organic solvent-based formulations.

Description of Related Art

Low volatile organic compound (VOC) aqueous paints have been developed as an alternative to environmentally unfriendly VOC solvent-based paints in response to environmental regulations limiting the level of VOCs in paint compositions. One of the challenges of formulating water-based paint formulations is achieving an acceptable balance of properties both during application and in the final film compared to the traditional solvent based paints. In particular, the low VOC aqueous paints dry faster, have shorter open time, and poorer flow and leveling. Open time reflects the amount of time within which paint can be reworked on a surface post application, and for water-based formulations is up to 10 minutes. Open time problems include, but are not limited to, skinning of left-open paints, not being able to cut back or blend in during brushing and rolling, and non-uniformity of sprayed surfaces. These problems are further exacerbated under fast dry conditions such as low humidity and high temperature.

Some attempts to extend the open time of architectural coatings have included adding crosslinkable oligomers or emulsion polymers to the paint formulation. The propylene and ethylene glycols are also used to improve open time and wet edge and are universally considered to be VOCs. However, there still remains a need for a water soluble open time extender solutions for low-VOC aqueous paints.

SUMMARY OF THE INVENTION

In a broad aspect, the disclosure provides paint compositions comprising a new class of isoxazolidine derivatives that extended the open time of the formulation as compared to formulations that do not contain the isoxazolidine derivatives. Thus, one aspect of the disclosure provides paint compositions comprising a solvent, at least one binder, and at least one compound of the formula I:

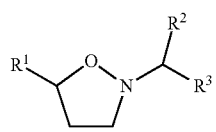

I or a salt thereof, wherein
$R^1$ is $C_1$-$C_{30}$ alkyl, $C_2$-$C_{30}$ alkenyl, $C_2$-$C_{30}$ alkynyl, $C_1$-$C_{20}$ hydroxyalkyl, or $C_1$-$C_{20}$ haloalkyl, wherein each of which is independently optionally substituted with one or more $R^4$;
$R^2$ and $R^3$ are independently hydrogen, $C_1$-$C_{12}$ alkyl, $C_1$-$C_{12}$ alkenyl, or $C_1$-$C_{12}$ alkynyl each optionally substituted with one or more of $R^5$;
wherein each $R^4$ and $R^5$ are independently selected from the group consisting of halogen, —Si($C_1$-$C_6$ alkyl)$_3$, cycloalkyl, aryl, heteroaryl, and heterocyclyl.

In another aspect, the disclosure provides methods for reducing the volatile organic compound content of an aqueous based paint composition, the method comprising using as the neutralizing agent an effective amount of a compound of formula I:

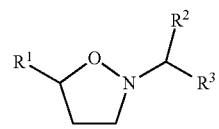

I or an acceptable salt thereof, wherein
$R^1$ is $C_1$-$C_{30}$ alkyl, $C_2$-$C_{30}$ alkenyl, $C_2$-$C_{30}$ alkynyl, $C_1$-$C_{20}$ hydroxyalkyl, or $C_1$-$C_{20}$ haloalkyl, wherein each of which is independently optionally substituted with one or more $R^4$;
$R^2$ and $R^3$ are independently hydrogen, $C_1$-$C_{12}$ alkyl, $C_1$-$C_{12}$ alkenyl, or $C_1$-$C_{12}$ alkynyl each optionally substituted with one or more of $R^5$;
wherein each $R^4$ and $R^5$ are independently selected from the group consisting of halogen, —Si($C_1$-$C_6$ alkyl)$_3$, cycloalkyl, aryl, heteroaryl, and heterocyclyl.

DETAILED DESCRIPTION OF THE INVENTION

Before the disclosed methods and materials are described, it is to be understood that the aspects described herein are not limited to specific embodiments, or configurations, and as such can, of course, vary. It is also to be understood that the terminology used herein is for the purpose of describing particular aspects only and, unless specifically defined herein, is not intended to be limiting.

In view of the present disclosure, the methods and active materials described herein can be configured by the person of ordinary skill in the art to meet the desired need. In general, the disclosed materials and methods provide improvements in paint formulations, particularly in the water-based paint formulations. For example, in certain aspect, the paint compositions of the disclosure (i.e., the compositions that comprise one or more of compounds of formula I) extend the open time of the formulation as compared to formulations that does not contain the compounds of formula I.

In general, by "open time" is meant the time interval during which freshly applied paint can be blended with subsequently applied paint without the appearance of lack of uniformity. Specifically, open time is the time in which irregularities in a freshly applied coating can be repaired, while the period in which a coating can be applied over an existing paint film without leaving lap marks is the wet edge time. There are numerous methods to characterize open time and wet edge time. One of the most common techniques requires a paint film to be drawn down on a sealed chart with a series of 'X' marks in the center of the drawdown. After fixed periods of time, paint is brushed back and forth across the film. The point at which the edge of the drawdown can no longer be worked into the body of the paint is referred to as the wet edge time, while the time at which the 'X' begins to show through the paint is the open time. These techniques are further described in Example 2.

Particularly useful compounds of formula I that can be used in the paint compositions and/or methods of the disclosure are those where $R^1$ is $C_1$-$C_{30}$ alkyl, $C_2$-$C_{30}$ alkenyl, $C_2$-$C_{30}$ alkynyl, or $C_1$-$C_{20}$ haloalkyl, and wherein each of which is independently optionally substituted with one or more $R^4$. Other embodiments provide compounds of formula I where $R^1$ is $C_1$-$C_{30}$ alkyl, $C_2$-$C_{30}$ alkenyl, or $C_2$-$C_{30}$ alkynyl, each of which is independently optionally substituted with one or more $R^4$. In certain embodiments, the compounds of formula I are wherein $R^1$ is $C_3$-$C_{30}$ alkyl, $C_3$-$C_{30}$ alkenyl, or $C_3$-$C_{30}$ alkynyl, each of which is independently optionally substituted with one or more $R^4$. In other embodiments, the compounds of formula I are wherein $R^1$ is $C_3$-$C_{30}$ alkyl. In further embodiment, $R^1$ is $C_3$-$C_{30}$ alkyl optionally substituted with one or more $R^4$.

Certain embodiments of the paint compositions and/or methods of the disclosure include those where $R^1$ is $C_3$-$C_{30}$ alkyl, $C_3$-$C_3$ alkenyl, or $C_3$-$C_{30}$ alkynyl. Other embodiments include those wherein $R^1$ is $C_3$-$C_{30}$ alkyl.

Embodiments of the paint compositions and/or methods of the disclosure include those where $R^1$ is decyl.

Other particularly useful compounds of formula I and any preceding embodiment that can be used in the paint compositions and/or methods of the disclosure include those wherein $R^2$ and $R^3$ are independently hydrogen or $C_1$-$C_{12}$ alkyl each optionally substituted with one or more of $R^5$. Certain embodiments of the paint compositions and/or methods of the disclosure include those where $R^2$ and $R^3$ are independently $C_1$-$C_{12}$ alkyl. For example, one embodiment provides compounds where $R^2$ and $R^3$ are independently methyl. Other certain embodiments of the paint compositions and/or methods of the disclosure include those where one of $R^2$ and $R^3$ is hydrogen and the other is $C_1$-$C_{12}$ alkyl. For example, one embodiment provides compounds where $R^2$ is hydrogen and $R^3$ is $C_1$-$C_6$ alkyl.

In one embodiment of the paint compositions and/or method of the disclosure, the compound of formula I is:

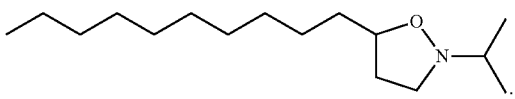 [SMILES: CCCCCCCCCCC1CCN(C(C)C)O1]

The compounds of formula I described herein can be provided in various content, depending, e.g., on the desired end properties of the paint composition. For example, in certain embodiments, a compound of formula I as described herein is present from about 0.1 to about 10 weight % of the paint composition. In certain embodiments, a compound of formula I as described herein is present from about 0.1 to about 7 weight %, or about 0.1 to about 5 weight %, or about 0.1 to about 4 weight %, or about 0.1 to about 3 weight %, or about 0.1 to about 2 weight %, or about 0.1 to about 1.5 weight %, or about 0.1 to about 1 weight %, or about 0.2 to about 5 weight %, or about 0.25 to about 5 weight %, or about 0.25 to about 4 weight %, or about 0.25 to about 3 weight %, or about 0.25 to about 2 weight %, or about 0.25 to about 1.5 weight %, or about 0.25 to about 1 weight %,or about 0.5 to about 5 weight %, or about 0.5 to about 4 weight %, or about 0.5 to about 3 weight %, or about 0.5 to about 2 weight %, or about 0.5 to about 1.5 weight %, or about 0.5 to about 1 weight %, or about 0.3 weight %, or about 0.4 weight %, or about 0.5 weight %, or about 0.6 weight %, or about 0.7 weight %, or about 0.8 weight %, or about 0.9 weight %, or about 1 weight %, or about 1.1 weight %, or about 1.2 weight %, or about 1.3 weight %, or about 1.4 weight %, or about 1.5 weight %, or about 2 weight %, or about 2.5 weight %, or about 3 weight %. In one embodiment, a compound of formula I as described herein is present from about 0.5 to about 1.5 weight % based on the paint composition.

Particularly useful embodiments of the paint compositions of the disclosure are those where the solvent is water. In other useful embodiments, the solvent is a co-solvent of water and another short chain water-soluble alcohol and/or glycol, such as ethylene glycol, diethylene glycol, propylene glycol, and glycerin. The short chain water-soluble alcohol and/or glycol may be present in the amount of about 1 to about 30 volume %, or about 10 to about 30 volume %, or about 10 to about 20 volume %, or about 1 to about 10 volume % based on the volume of the solvent.

In one embodiment, the paint composition of the disclosure are where the solvent can be provided in various content, depending, e.g., on the desired end properties of the paint composition. For example, in certain embodiments, a solvent as described herein is present from about 10 to about 80 weight % of the paint composition. In certain embodiments, a solvent as described herein is present from about 20 to about 80 weight %, or about 30 to about 80 weight %, or about 40 to about 80 weight %, or about 20 to about 70 weight %, or about 30 to about 70 weight %, or about 40 to about 70 weight %, or about 20 to about 60 weight %, or about 30 to about 60 weight %, or about 40 to about 60 weight %, or about 45 to about 60 weight %, or about 45 to about 55 weight %, or about 50 to about 55 weight %, or about 10 to about 70 weight %, or about 10 to about 60 weight %,or about 10 to about 55 weight %, or about 10 to about 50 weight %, or about 45 to about 65 weight %, or about 45 to about 70 weight %, or about 45 to about 75 weight %, or about 45 to about 80 weight %, or about 45 weight %, or about 50 weight %, or about 55 weight %, or about 60 weight %. In one embodiment, a compound of formula I as described herein is present from about 50 to about 55 weight % based on the paint composition.

Particular embodiments of the paint compositions of the disclosure further comprise one or more of neutralizing buffers. Suitable neutralizing buffers include, but are not limited to, specific organic or inorganic neutralizers. Neutralizing buffers also include, but are not limited to, particular bases. Suitable bases include inorganic and organic bases. Suitable inorganic bases include the full range of the hydroxide, carbonate, ammonia, bicarbonate, and acetate bases of alkali or alkaline metals. Suitable organic bases include primary/secondary/tertiary amines, diamines, and triamines. Exemplary basic neutralizing buffers include, but are not limited to sodium hydroxide, potassium hydroxide, ammonium hydroxide.

Particular embodiments of the paint compositions of the disclosure further comprise one or more of thickeners, pigments, light stabilizers, surfactants, anti-foaming agents, humectants, and biocides.

Thickeners included in the paint composition of the present disclosure typically comprise the aqueous emulsion reaction product of an unsaturated carboxylic acid monomer, e.g., methacrylic acid; a monoethylenically unsaturated monomer different from the carboxylic acid monomer, e.g.

ethyl acrylate; a macromonomer comprising a hydrophobic portion and an alkoxylated portion which is polymerizable with the other monomers; and a monomer having latent crosslinking functionality. Suitable thickeners include UCAR 146 and UCAR Polyphobe TR115, Acrysol RM 500, Acrysol DR-1, Acrysol DR-73, Acrysol ASE 60 HEC, and HEUR/HIRESOL (grades 80, 85, 500, 370, 180, 200, 1800, and 2000).

The thickeners may be varied depending on the desired uniform viscosity. The selection of suitable thickener and the quantity to be used for the paint composition of the present disclosure is within the skill of the person skilled in the art using routine trial and experimentation.

One or more pigments may be included in the paint composition. Pigmentation provides color and opacity and may contribute to other properties of the paint composition. For example, the pigment particle size and shape, ease of wettability or properties relating to specific density contribute to the viscosity and application characteristics of the wet paint composition and ultimately properties of the dried paint coatings. The choice of pigment may have an effect on the choice of other ingredients such as thickeners, and a skilled artisan will determine the appropriate selection of pigment and the quantity to be used using routine trial and experimentation.

Color pigments may be organic or inorganic compounds, natural or synthetic and these may be used separately or in combination. Titanium dioxide is a common white pigment with a high refractive index and excellent hiding power (the ability to render paint opaque). It is frequently used with both colored organic and inorganic pigments. Suitable titanium dioxides are available under the TI-PURE®. (DuPont Company, Wilmington, Del.), TIONA® (Millennium Chemicals, Maryland), TRONOX® (Tronox Incorporated, Oklahoma), TIONA® TR-90 and TRONOX® CR-826. Iron oxides range in color from yellow and red to brown and black. Azo pigments are a common class of organic color pigments. Pigments called "extender" pigments may be used in conjunction with other pigments. The use of extender pigments reduces shrinkage stresses within the paint film and increases the pigment volume content at relatively low cost. Extender pigments include those based on carbonates, silicates, sulfates, barytes and mica. The use of extender pigments aids in viscosity and flow control and reinforces the dry film strength.

The surfactant useful in the paint compositions may be nonionic or anionic surfactant. Examples of suitable surfactants include, but are not limited to, sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly ethoxyethyl sulfate, sorbitan monolaurate, polyoxyethylene 80 sorbitan laurate, polyoxyethylene 40 sorbitol septaoleate, polyoxyethylene alkyl phenol surfactants, and N,N-bis-carboxyethyl lauramine. Suitable surfactants also include, but are not limited to, commercially available Orotan 1124, Orotan 1288, Orotan 731 DP, Orotan 850, Aerosol TR-70S, Lecithin, EFKA 6220, Igepal CO 430, Igepal CO 530, linear alcohol ethoxylates (L-12-3 and L-24-4), Lutensol XP40, Lutensol XP50, Pluronic L64, Tergitol 15-S-3, Tergitol 15-S-5, Tetronic 901, Tetronic 90R4, Triton X-207, Dextrol OC-50, Disperbyk, Nekal 25L, Pluronic 17R4, Pluronic L44, Pluronic L64, Pluronic F68, Pluronic 25R4, APE dodoxynol-6 (RC-520), Tamol 1124, Tamol 731, Tamol 681, Tamol 165, Triton CF-10, Surfactol 365, Surfynol CT-121, Tergitol® TMN-6, Tergitol® 15-S-5, Tergitol® 15-S-20, and Tergitol® 15-S-30, and DOWFAX™.

Particular embodiments of the paint compositions of the disclosure is wherein the binder comprises homopolymers and copolymers of acrylic and methacrylic acids and esters thereof, copolymers of acrylic and methacrylic acids and esters thereof with styrene, vinyl monomers, and ethylene; vinyl acetate-ethylene copolymers, polyvinyl alcohol, polyurethanes, epoxide polymers, epoxy-modified acrylic polymers, and mixtures of two or more of the aforementioned polymers. In one embodiment, the binder is acrylic polymer, vinyl/acrylic copolymers, styrenated acrylic polymer, and vinyl acetate/ethylene copolymers. The binder of the disclosure is present in the paint composition in an effective amount to bind the pigment particles together into a cohesive paint film upon drying.

DEFINITIONS

The following terms and expressions used have the indicated meanings.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the paint composition). All mol % values are based on the moles of the active compounds.

The term "alkenyl" as used herein, means a straight or branched chain hydrocarbon containing from 2 to 20 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl, and 2-propyl-2-heptenyl. The term "alkenylene" refers to a divalent alkenyl group, where alkenyl is as defined herein.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkyl" as used herein, means a straight or branched chain hydrocarbon containing from 1 to 20 carbon atoms unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. The term "alkylene" refers to a divalent alkyl group, where alkyl is as defined herein.

The term "alkynyl" as used herein, means a straight or branched chain hydrocarbon group containing from 2 to 10 carbon atoms unless otherwise specified, and containing at least one carbon-carbon triple bond. Representative examples of alkynyl include, but are not limited, to acetylenyl, 1-propynyl, 2-propynyl, 3-butynyl, 2-pentynyl, and 1-butynyl. The term "alkynylene" refers to a divalent alkynyl group, where alkynyl is as defined herein.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system, or a polycyclic ring system containing at least one phenyl ring. The bicyclic aryl can be azulenyl, naphthyl, or a phenyl fused to a cycloalkyl, a cycloalkenyl, or a heterocyclyl. The bicyclic or polycyclic aryl is attached to the parent molecular moiety through any carbon atom contained within the phenyl portion of the bicyclic or polycyclic system, or any carbon atom with the napthyl, azulenyl, anthracene, or pyrene ring.

The term "cycloalkyl" as used herein, means a monocyclic or a bicyclic cycloalkyl ring system. Monocyclic ring systems are cyclic hydrocarbon groups containing from 3 to 10 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane.

The term "halogen" as used herein, means —CI, —Br, —I or —F.

The terms "haloalkyl", "haloalkenyl" and "haloalkoxy" refer to an alkyl, alkenyl or alkoxy group, as the case may be, which is substituted with one or more halogen atoms.

The term "heteroaryl," as used herein, means a monocyclic heteroaryl or a bicyclic or polycyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. The bicyclic or polycyclic heteroaryl consists of a heteroaryl fused to a phenyl, a cycloalkyl, a cycloalkenyl, a heterocyclyl, or a heteroaryl. Representative examples of heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, or purinyl.

The term "heterocyclyl" as used herein, means a monocyclic heterocycle or a bicyclic heterocycle. The monocyclic heterocycle is a 5, 6 or 7 membered ring containing at least one heteroatom independently selected from the group consisting of O, N, and S where the ring is saturated or unsaturated, but not aromatic. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The bicyclic heterocycle is a monocyclic heterocycle fused to either a phenyl, a monocyclic cycloalkyl, a monocyclic cycloalkenyl, a monocyclic heterocycle, or a monocyclic heteroaryl. Representative examples of heterocycle include, but are not limited to, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, maleimidyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, trithianyl, 2,3-dihydrobenzofuran-2-yl, and indolinyl.

The phrase "one or more" substituents, as used herein, refers to a number of substituents that equals from one to the maximum number of substituents possible based on the number of available bonding sites, provided that the above conditions of stability and chemical feasibility are met. Unless otherwise indicated, an optionally substituted group may have a substituent at each substitutable position of the group, and the substituents may be either the same or different. As used herein, the term "independently selected" means that the same or different values may be selected for multiple instances of a given variable in a single compound.

"Optional" or "optionally" means that the subsequently described event or circumstance may or may not occur, and that the description includes instances where said event or circumstance occurs and instances in which it does not. One of ordinary skill in the art would understand that with respect to any molecule described as containing one or more optional substituents, only sterically practical and/or synthetically feasible compounds are meant to be included. "Optionally substituted" refers to all subsequent modifiers in a term, unless stated otherwise.

The term "polymer" as used herein, is synonymous with "copolymer", "heteropolymer" and "alternating copolymer" and means a large molecule (macromolecule) composed of a repeating series of one or more alternating monomeric species. These sub-units are typically connected by covalent chemical bonds.

The term "substituted", as used herein, means that a hydrogen radical of the designated moiety is replaced with the radical of a specified substituent, provided that the substitution results in a stable or chemically feasible compound. The term "substitutable", when used in reference to a designated atom, means that attached to the atom is a hydrogen radical, which can be replaced with the radical of a suitable substituent.

EXAMPLES

The methods of the disclosure are illustrated further by the following examples, which are not to be construed as limiting the disclosure in scope or spirit to the specific procedures and in them.

Example 1

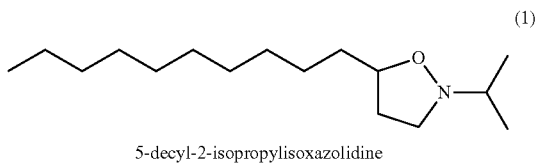 [SMILES: CCCCCCCCCCC1CCN(C(C)C)O1]

5-decyl-2-isopropylisoxazolidine

Compound 1, 5-decyl-2-isopropylisoxazolidine, was prepared essentially according to procedures disclosed in S. A. Ali et al. (*Corrosion Science* 47 (2005) -2659-2678.) and A. M. El-Shareefa et al. (*Oriental Journal of Chemistry* 21 (2005) 1-8).

Example 2

Three paint formulations were prepared as show in Table 1, where compound 1 was post-added at 0, 0.5, and 1.0 weight %:

TABLE 1

| | Composition % weight | | |
|---|---|---|---|
| Ingredient | Formulation 1 | Formulation 2 | Formulation 3 |
| Water | 17 | 17 | 17 |
| Kathon LXE | 0.1 | 0.1 | 0.1 |
| ROZONE 2000 | 0.3 | 0.3 | 0.3 |
| Tego Foamex | 0.02 | 0.02 | 0.02 |
| HEC | 0.5 | 0.5 | 0.5 |
| Orotan 731 A | 0.6 | 0.6 | 0.6 |
| AMP95 | 0.1 | 0.1 | 0.1 |
| Tergitol 15S40 | 0.2 | 0.2 | 0.2 |
| TiO$_2$ R 706 | 18.00 | 18.00 | 18.00 |
| Calcite MF | 4.00 | 4.00 | 4.00 |

TABLE 1-continued

| | Composition % weight | | |
|---|---|---|---|
| Ingredient | Formulation 1 | Formulation 2 | Formulation 3 |
| Omyacarb | 3 | 3 | 3 |
| ACRYSOL RM 5000 | 1 | 1 | 1 |
| AMP95 | 0.1 | 0.1 | 0.1 |
| Water | 16.16 | 16.16 | 16.16 |
| Tego Foamex | 0.02 | 0.02 | 0.02 |
| Water | 1.9 | 1.9 | 1.9 |
| ROPAQUE ULTRA E | 7.00 | 7.00 | 7.00 |
| Emulsion SF 018 | 30.00 | 30.00 | 30.00 |
| Total | 100 | 100 | 100 |
| Compound 1 post-added (weight %) | | | |
| | 0 | 0.5 | 1 |

The formulations were then subjected to open time testing. First, the paint drawdowns of 75 μm thickness were done on a glass sheet, and equivalently spaced "X" marks were drawn on the drawdown. The paint formulation was applied perpendicular to the drawdown, brushing the "X" mark across the initial drawdown. Perpendicular sections are repeated at 3, 5, 10, 15, 20 and 25 minutes after the making of the "X" marks. Open time of paint was noted to be the time elapsed when the "X" marks became visible. Formulation 1, which contained no compound 1, showed open time of 10 minutes (e.g., the time the X marks became visible.) Both, formulation 2 (0.5 wt % of 1) and formulation 3 (1 wt % of 1) showed open time of 15 minutes To estimate the effect of the addition of compound 1 on the paint properties, whiteness, opacity, and sheen were also measured. Paint drawdowns were done in 150 μm thickness. The opacity and whiteness were measured using device from Sheen Micromatch Plus. The sheen was measured using the Tri-Glossmaster from Sheen. The opacity and sheen results are shown in Table 2:

TABLE 2

| Ref. Sample | Test Sample | Opacity, % (Ref.) | Opacity, % (Sample) | Sheen 20°, 60°, 85° (Ref.) | Sheen 20°, 60°, 85° (Sample) |
|---|---|---|---|---|---|
| Formulation 1 | Formulation 2 (0.5 wt % of 1) | 95.45 | 94.69 | 1.8, 10.7, 23.0 | 2.1, 14.2, 30.0 |
| Formulation 1 | Formulation 3 (1 wt % of 1) | 94.92 | 94.75 | 1.8, 11.1, 24.3 | 1.9, 12.6, 25.3 |

To evaluate whiteness, the color difference was calculated as:

$$\Delta E = \sqrt{(\Delta L)^2 + (\Delta a)^2 + (\Delta b)^2}$$

where $\Delta L$, $\Delta a$ and $\Delta b$ are the differences between the test sample (the paint formulation with compound 1 added) and the reference (the paint formulation with no compound 1 added) of the CIE color space L, a, and b values.

TABLE 3

| Ref. Sample | Test Sample | L (Ref.) | L (Sample) | a (Ref.) | a (Sample) | b (Ref.) | b (Sample) | ΔE |
|---|---|---|---|---|---|---|---|---|
| Formulation 1 | Formulation 2 (0.5 wt % of 1) | 95.99 | 95.77 | −0.87 | −0.87 | 1.25 | 1.36 | 0.25 |
| Formulation 1 | Formulation 3 (1 wt % of 1) | 95.56 | 95.21 | −0.83 | −0.88 | 1.27 | 1.55 | 0.45 |

Example 3

Additional formulations where KOH was used as a neutralizer are shown in Table 4. Compound 1 was post-added at 0 and 1.0 weight %:

TABLE 4

| Ingredient | Composition % weight | |
|---|---|---|
| | Formulation 4 | Formulation 5 |
| Water | 17 | 16 |
| Kathon LXE | 0.1 | 0.1 |
| ROZONE 2000 | 0.3 | 0.3 |
| Tego Foamex | 0.02 | 0.02 |
| HEC | 0.5 | 0.5 |
| Orotan 731 A | 0.6 | 0.6 |
| KOH 10% | 0.1 | 0.1 |
| Tergitol 15S40 | 0.2 | 0.2 |
| TiO$_2$ R 706 | 18.00 | 18.00 |
| Talc 10 micron | 4.00 | 4.00 |
| Omyacarb | 3 | 3 |
| ACRYSOL RM 5000 | 1 | 1 |
| Water | 16.26 | 16.26 |
| Tego Foamex | 0.02 | 0.02 |
| Water | 1.9 | 1.9 |
| ROPAQUE ULTRA E | 7.00 | 7.00 |
| Emulsion SF 018 | 30.00 | 30.00 |
| Total | 100 | 100 |
| | Compound 1 post-added (weight %) | |
| | 0 | 1 |

Open time of paint was measured as disclosed in Example 2. Formulation 4, which contained no compound 1, showed open time of 10 minutes (e.g., the time the X marks became visible.) Formulation 4 (containing 1 wt % of compound 1) showed open time of 15 minutes.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A paint composition comprising a solvent, at least one binder, and at least one compound of the formula:

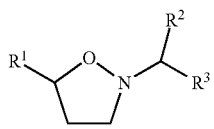

or a salt thereof, wherein
R$^1$ is C$_1$-C$_{30}$ alkyl, C$_2$-C$_{30}$ alkenyl, C$_2$-C$_{30}$ alkynyl, C$_1$-C$_{20}$ hydroxyalkyl, or C$_1$-C$_{20}$ haloalkyl, wherein each of which is independently optionally substituted with one or more R$^4$;
R$^2$ and R$^3$ are independently hydrogen, C$_1$-C$_{12}$ alkyl, C$_1$-C$_{12}$ alkenyl, or C$_1$-C$_{12}$ alkynyl each optionally substituted with one or more of R$^5$;
wherein each R$^4$ and R$^5$ are independently selected from the group consisting of halogen, —Si(C$_1$-C$_6$ alkyl)$_3$, cycloalkyl, aryl, heteroaryl, and heterocyclyh;
wherein the compound is present from about 0.1 to about 10 weight %.

2. The paint composition of claim 1, wherein R$^1$ is C$_3$-C$_{30}$ alkyl.

3. The paint composition of claim 1, wherein R$^1$ is decyl.

4. The paint composition of claim 1, wherein R$^2$ and R$^3$ are independently hydrogen or C$_1$-C$_{12}$ alkyl.

5. The paint composition of claim 4, wherein R$^2$ and R$^3$ are independently C$_1$-C$_{12}$ alkyl.

6. The paint composition of claim 5, wherein R$^2$ and R$^3$ are independently methyl.

7. The paint composition of claim 1, wherein the compound is:

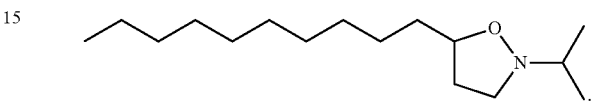

8. The paint composition of claim 1, wherein the compound is present from about 0.2 to about 5 weight %.

9. The paint composition of claim 1, wherein the solvent is water.

10. The paint composition of claim 9, wherein water is present from about 10 to about 80 weight %.

11. The paint composition of claim 1, further comprising one or more of neutralizing buffers.

12. The paint composition of claim 1, further comprising one or more of thickeners, pigments, light stabilizers, surfactants, anti-foaming agents, humectants, and biocides.

13. The paint composition of claim 1, wherein the binder comprises acrylic polymer, vinyl/acrylic copolymer, styrenated acrylic polymer, or vinyl acetate/ethylene copolymer.

14. A method for producing an aqueous based paint or coating with low volatile organic compound content, the method comprising using as a neutralizing agent about 0.1 to about 10 weight %, based on the total composition, a compound of formula:

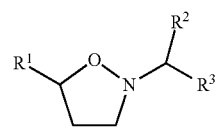

or an acceptable salt thereof, wherein
R$^1$ is C$_1$-C$_{30}$ alkyl, C$_2$-C$_{30}$ alkenyl, C$_2$-C$_{30}$ alkynyl, hydroxyalkyl, or C$_1$-C$_{20}$ hydroxyalkyl, C$_1$-C$_{20}$ haloalkyl;
R$^2$ and R$^3$ are independently hydrogen, C$_1$-C$_{12}$ alkyl, C$_1$-C$_{12}$ alkenyl, or C$_1$-C$_{12}$ alkynyl.

15. The method of claim 14, wherein about 0.2 to about 5 weight % of the neutralizing agent is used, based on the total composition.

16. The method of claim 14, wherein R$^1$ is C$_3$-C$_{30}$ alkyl.

17. The method of claim 14, wherein R$^1$ is decyl.

18. The method of claim 14, wherein R$^2$ and R$^3$ are independently hydrogen or C$_1$-C$_{12}$ alkyl.

19. The method of claim 18, wherein R$^2$ and R$^3$ are independently C$_1$-C$_{12}$ alkyl.

20. The method of claim 1, wherein the compound is:
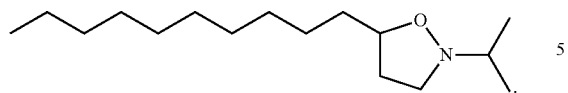
* * * * *